(12) United States Patent
Metcalf et al.

(10) Patent No.: US 8,117,418 B1
(45) Date of Patent: Feb. 14, 2012

(54) METHOD AND SYSTEM FOR MANAGING VIRTUAL ADDRESSES OF A PLURALITY OF PROCESSES CORRESPONDING TO AN APPLICATION

(75) Inventors: Chris Metcalf, Wellesley, MA (US); Patrick Griffin, Brookline, MA (US)

(73) Assignee: Tilera Corporation, San Jose, CA (US)

( * ) Notice: Subject to any disclaimer, the term of this patent is extended or adjusted under 35 U.S.C. 154(b) by 681 days.

(21) Appl. No.: 12/291,605

(22) Filed: Nov. 12, 2008

Related U.S. Application Data (60) Provisional application No. 61/003,507, filed on Nov. 16, 2007.

(51) Int. Cl.
| | |
|---|---|
| G06F 12/00 | (2006.01) |
| G06F 13/00 | (2006.01) |
| G06F 21/00 | (2006.01) |
| G06F 13/28 | (2006.01) |
| G06F 9/26 | (2006.01) |
| G06F 9/34 | (2006.01) |
| G06F 9/46 | (2006.01) |

(52) U.S. Cl. ............ 711/203; 711/6; 711/173; 718/104
(58) Field of Classification Search .............. 711/6, 173, 711/203–206; 718/104
See application file for complete search history.

(56) References Cited

U.S. PATENT DOCUMENTS

| | | | |
|---|---|---|---|
| 2004/0215919 A1* | 10/2004 | Emmes | 711/208 |
| 2006/0206658 A1* | 9/2006 | Hendel et al. | 711/6 |
| 2007/0073994 A1* | 3/2007 | Zohar et al. | 711/173 |
| 2007/0169121 A1* | 7/2007 | Hunt et al. | 718/1 |
| 2007/0266199 A1* | 11/2007 | Peled et al. | 711/6 |

OTHER PUBLICATIONS

Tanenbaum, Andrew, Structured Computer Organization, 1984, Prentice-Hall, Inc.*

* cited by examiner

*Primary Examiner* — Jared Rutz
*Assistant Examiner* — Ryan Bertram (57) ABSTRACT

The present invention provides a method and system for managing virtual addresses of a plurality of processes corresponding to an application. The method comprises designating a first set of ranges of virtual addresses to the plurality of processes, wherein the virtual addresses of the first set of ranges map to a memory region shared among the plurality of processes. Further, the method comprises designating a second set of ranges of virtual addresses to the plurality of processes, wherein the virtual addresses of the second set of ranges map to a memory region independently used by a process of the plurality of processes. Furthermore, the method comprises adding or removing virtual address ranges from one of the first set of ranges and the second set of ranges based on requirements of the application, wherein the addition or removal is performed in virtual addresses of the plurality of processes.

10 Claims, 5 Drawing Sheets

METHOD AND SYSTEM FOR MANAGING VIRTUAL ADDRESSES OF A PLURALITY OF PROCESSES CORRESPONDING TO AN APPLICATION

CROSS REFERENCE TO RELATED APPLICATION

This application claims the benefit of U.S. Provisional Application No. 61/003,507 filed Nov. 16, 2007.

BACKGROUND OF THE INVENTION

The present invention relates to memory management in an operating system. More specifically, the present invention relates to sharing of memory among multiple processes for facilitating concurrent execution of the multiple processes on the operating system.

Sharing memory is a method of inter-process communication, i.e., a way of sharing data among multiple processes running at the same time on an operating system of a computing device. Various operating systems such as Unix®, Windows, and Linux facilitate the sharing of memory to perform parallel processing of more than one application on the operating system.

Various conventional methods are used to facilitate the sharing of memory in real-time among multiple processes. One such conventional method uses memory mapping of the shared data. The operating system maps a file or a shared data object onto the virtual addresses of multiple processes, but at potentially different virtual addresses of the memory. In such cases, indirect pointer addressing is used to access the memory. The indirect pointers to the memory may be treated as offsets from the beginning of a virtual address of the memory. As a result, all references to data in the virtual addresses are made by adding an offset to the base of the mapped data. Further, all the references are returned separately to each of the multiple processes. This operation is slow and lacks convenience in comparison to direct pointer addressing. In addition, the pointers may not be saved to the shared memory, and may cause subtle bugs in the system.

In another conventional method, the operating system executes multi-threaded programming. In multi-threaded programming, multiple threads share the same address of the memory. However, writing via an incorrect pointer to the memory in a thread can corrupt data from another thread or other data that is not meant to be visible to other threads. Further, in the thread model, the size of available virtual address is limited to the amount addressable in a single address. In such a system, the amount of memory that can be allocated is limited to the available virtual address.

In case of a shared virtual address, the multiple processes need to make coordinated attempts to allocate memory in the shared address to exchange information through some external channel. Examples of external channels include, but are not limited to, file descriptors, sockets, and files. The multiple processes may keep trying to locate a corresponding suitable physical address of the memory. Alternatively, the processes involved may choose a single fixed physical address that works on a given machine, but may fail with slight changes to the operating system with the passage of time, causing unexpected program failure. Therefore, the process of sharing memory through the sharing of the virtual address is failure-prone.

In light of the foregoing discussion, there exists a need for a method and system that can efficiently manage addresses in a multi-processing environment. The operating system should preferably avoid the acquiring of multiple locks across the multiple processes to perform a single system call. Further, the operating system should preferably include high-performance techniques for allocating shared memory across multiple processes without the requirement to lock addresses of all the processes running on the operating system. Furthermore, there exists a need for a method and system that facilitates the direct pointer addressing to the memory. Furthermore, the method and system should preferably lower the risk of data corruption in the memory. Additionally, there exists a need for a method and system which can scale the amount of allocable memory in proportion to the number of processes running on the operating system and prevent performance loss.

SUMMARY

An object of the present invention is to provide a method, system and computer program product for managing virtual addresses of a plurality of processes corresponding to an application running on an operating system in a computing device.

Another object of the present invention is to provide a method, system and computer program product for direct pointer addressing to a memory.

Yet another object of the present invention is to provide a method, system and computer program product for scaling the amount of allocable memory in proportion to the number of processes running on the operating system.

Various embodiments of the present invention provide a method for managing virtual addresses of a plurality of processes corresponding to an application running on the operating system in the computing device. The method includes designating a first set of ranges of virtual addresses to the plurality of processes. The virtual addresses of the first set of ranges map to a memory region shared among the plurality of processes. Further, the method includes designating a second set of ranges of virtual addresses to the plurality of processes. The virtual addresses of the second set of ranges map to a memory region independently used by a process of the plurality of processes. Furthermore, the method includes performing either addition or removal of virtual address ranges to/from one of the first set of ranges and the second set of ranges based on the requirements of the application. The addition or removal is performed in virtual addresses of the plurality of processes.

Various embodiments of the present invention provide a system for managing virtual addresses of a plurality of processes corresponding to an application. The system includes a common map and a multi-level page table. The common map is an operating system data structure which includes a first set of virtual address ranges, a second set of virtual address ranges, and a third set of virtual address ranges. The virtual addresses of the first set of ranges map to a memory region shared by the plurality of processes. Further, the virtual addresses of the second set of ranges map to a memory region independently used by a process of the plurality of processes. The virtual addresses of the third set of ranges is configured to be used as one of a virtual address of the first set of ranges and a virtual address of the second set of ranges, based on requirements of the application. The multi-level page table is a data structure for storing mapping between virtual addresses and physical addresses of memory, and includes a mapping between the first set of virtual address ranges and a set of physical address ranges of memory corresponding to the first set of ranges stored at one or more levels of the multi-level page table. Further, the multi-level page table includes a mapping between the second set of virtual address ranges and a set of physical address ranges of memory corresponding to the second set of ranges stored at one or more levels of the multi-level page table.

Various embodiments of the present invention provide a computer program product for managing virtual addresses of a plurality of processes corresponding to an application. The computer program product includes program instructions for designating a first set of ranges of virtual addresses to the plurality of processes. The virtual addresses of the first set of ranges map to a memory region shared among the plurality of processes. Further, the computer program product includes program instructions for designating a second set of ranges of virtual addresses to the plurality of processes. The virtual addresses of the second set of ranges map to a memory region independently used by a process of the plurality of processes. Furthermore, the computer program product includes program instructions for performing either addition or removal of virtual address ranges to/from one of the first set of ranges and the second set of ranges based on requirements of the application. The addition or removal is performed in virtual addresses of the plurality of processes.

Various embodiments of the present invention provide a method, system, and computer program product managing virtual addresses of a plurality of processes corresponding to an application running on the operating system in the computing device. The method, system and computer program product provide an operating system data structure that facilitates the sharing of the memory among multiple processes. The operating system uses a common map, wherein the common map is the operating system data structure to allocate various types of memory to the multiple processes. The common map partitions the virtual addresses of the memory into three types of virtual address ranges. In the common map, a first set of ranges of virtual addresses are designated as common addresses. A second set of ranges of virtual addresses are designated as private addresses. Additionally, a third set of ranges of virtual addresses are designated as unreserved addresses. Hereinafter, for the sake of clarity of the description, the first set of ranges of virtual addresses will be collectively referred to as common addresses. Similarly, the second set of ranges of virtual addresses will be collectively referred to as private addresses, and the third set of virtual addresses will be referred to as unreserved addresses. Virtual addresses corresponding to common addresses can be shared by more than one process, virtual addresses corresponding to private addresses are exclusively used by a process, and an unreserved address can be used either as a private or common address depending upon the requirement of the memory by the multiple processes. Virtual address ranges can be added to one of the first set of ranges and the second set of ranges. The addition is performed in virtual addresses of the plurality of processes. Similarly, virtual address ranges can also be removed from one of the first set of ranges and the second set of ranges. The removal is performed in virtual addresses of the plurality of processes.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DETAILED DESCRIPTION OF THE INVENTION

Various embodiments of the present invention provide a method and system for managing virtual addresses of a plurality of processes corresponding to an application running on an operating system in a computing device. Examples of the computing device include, but are not limited to, personal computers, mobile devices, and handheld devices. The method and system provide a new operating system data structure that facilitates the sharing of the memory among multiple processes. The operating system uses the data structure to allocate various types of memory to the multiple processes. In accordance with an embodiment of the present invention, the data structure is referred to as the common map. The common map partitions the virtual addresses of the memory into three types of virtual address ranges: private, common and unreserved. In the common map, a first set of ranges of virtual addresses are designated as common addresses. A second set of ranges of virtual addresses are designated as private addresses. Additionally, a third set of ranges of virtual addresses are designated as unreserved addresses. Virtual addresses corresponding to common addresses can be shared by more than one process, virtual addresses corresponding to private addresses can be exclusively used by a process for private memory, and an unreserved address can be used either as a private or common address depending upon the requirement of the memory by the multiple processes. Virtual address ranges can be added to one of the first set of ranges and the second set of ranges. The addition is performed in virtual addresses of the plurality of processes. Similarly, virtual address ranges can also be removed from one of the first set of ranges and the second set of ranges. The removal is performed in virtual addresses of the plurality of processes.

Figure 1:
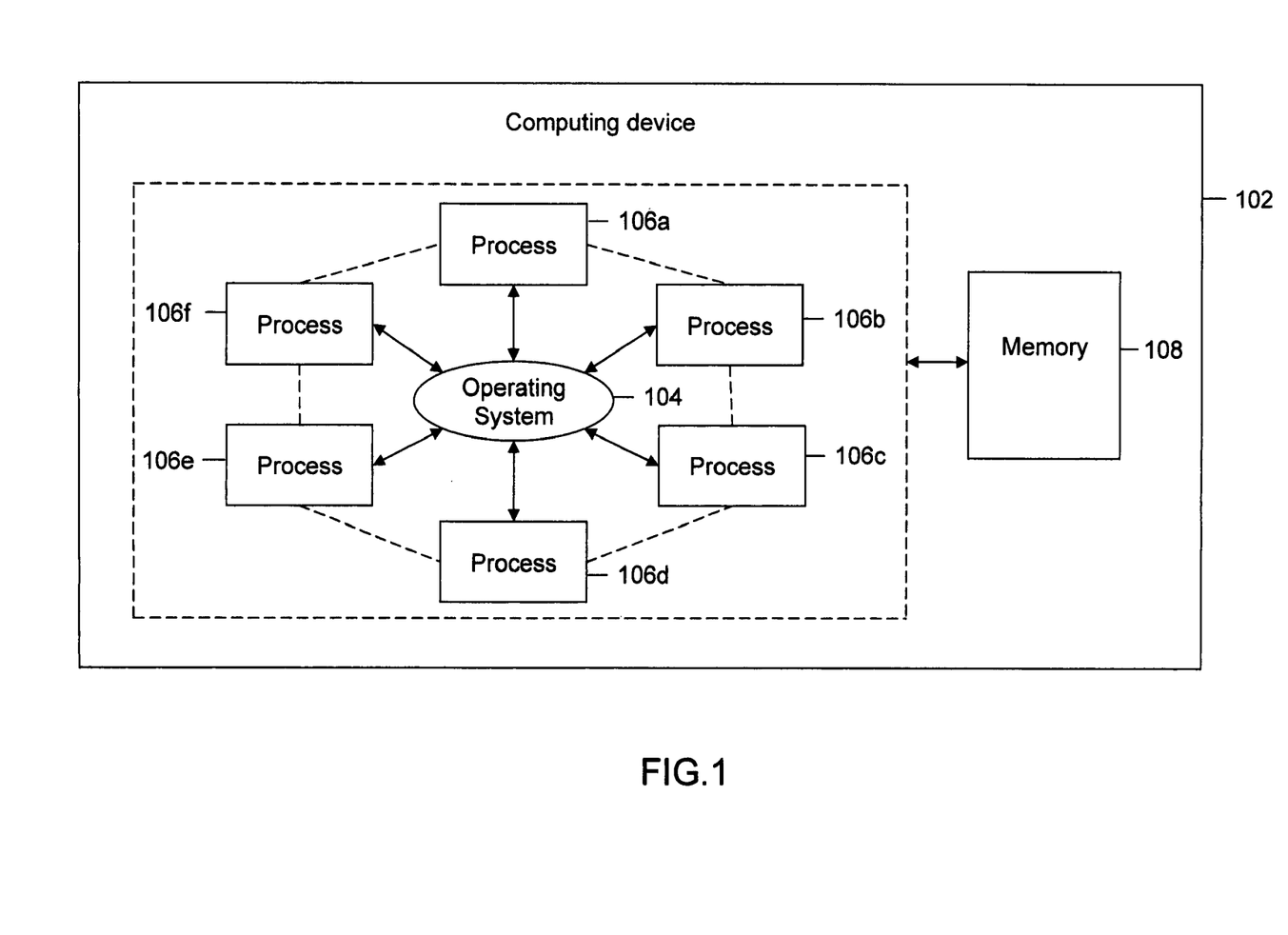
FIG. 1 illustrates a computing device in accordance with various embodiments of the invention.

FIG. 1 illustrates a computing device 102 in accordance with various embodiments of the present invention. Computing device 102 includes an operating system 104 that is a set of computer programs for managing hardware and software resources of computing device 102. Examples of computing device 102 include, but are not limited to, personal computers, mobile phones and handheld devices. The functions of operating system 104 include, but are not limited to, controlling and allocating memory, prioritizing system requests and controlling input and output devices of computing device 102. Examples of operating system 104 include, but are not limited to, Windows, Linux, and Mac OS. Various processes 106a, 106b, 106c, 106d, 106e and 106f, hereinafter collectively referred to as processes 106, are instances of computer programs that are being executed on operating system 104. A program is a passive collection of instructions, whereas a process is the actual execution of those instructions. Computing device 102 further includes memory 108. During runtime, the plurality of processes 106 utilize memory 108 for execution. Operating system 104 allocates memory 108 to the plurality of processes 106 at their respective virtual addresses. In this case, run-time refers to the operation of a computer program and the duration of its execution from beginning to termination.

A person of ordinary skill in the art will understand that the number of processes 106 is not limited to six, but has been assumed as six for the exemplary purpose of explaining the invention. Operating system 104 allocates memory 108 to processes 106 to facilitate concurrent execution of processes 106 on it. In accordance with various embodiments of the present invention, processes of a single application program may belong to one group. There can be one or more groups of processes running at the same time on operating system 104. For example, processes 106a, 106b, 106c and 106d may belong to a first group of processes, hereinafter referred to as processes of the first group. Further, processes 106e and 106f may belong to a second group of processes. Operating system 104 assigns a data structure such as a common map to the first and second group. The common map includes various types of virtual addresses for processes of a particular group. For example, a common map for the processes of the first group will include various types of virtual addresses for processes 106a, 106b, 106c and 106d. The common map for the first group is illustrated in detail with reference to FIG. 2.

Figure 2:
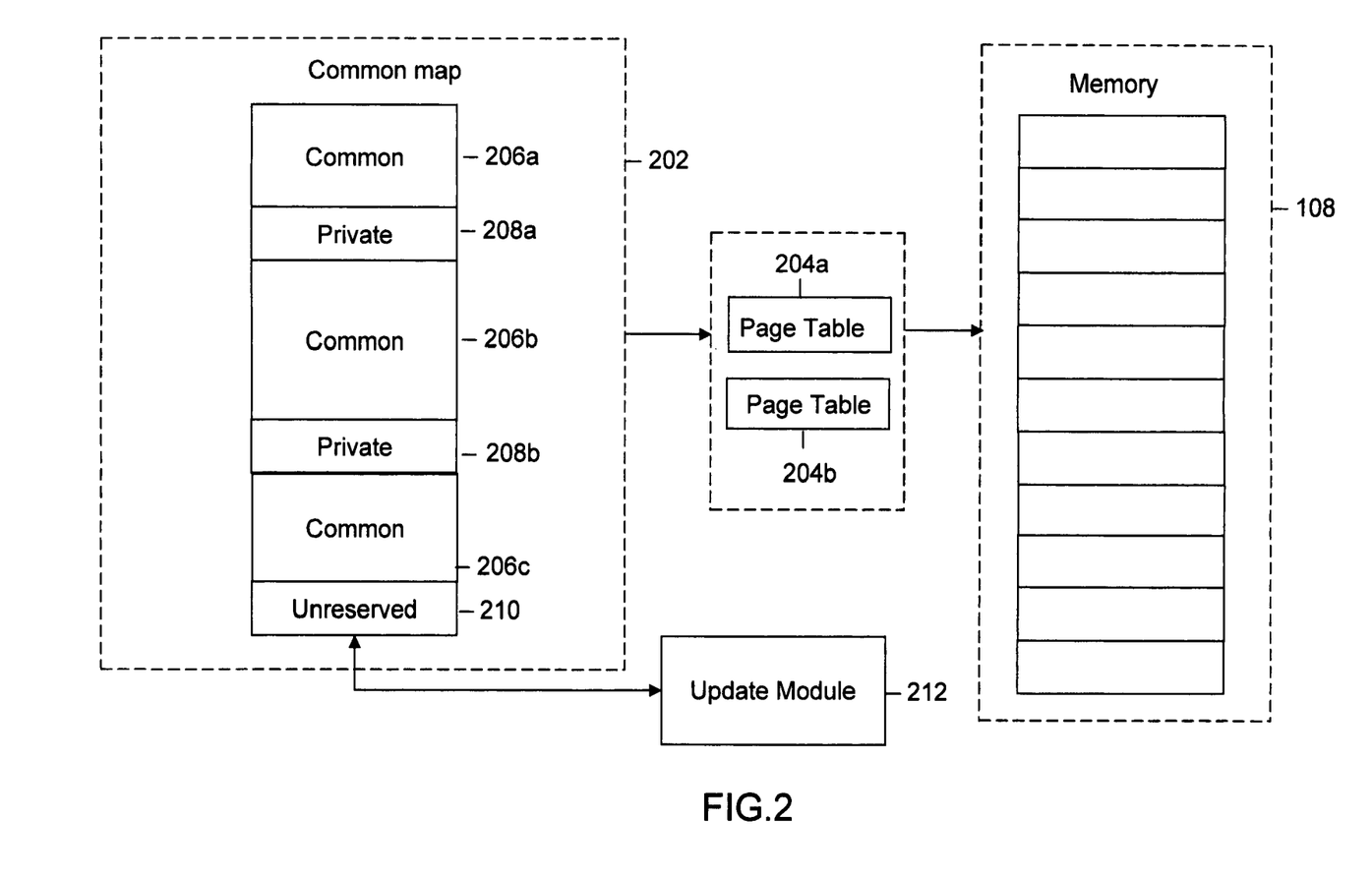
FIG. 2 illustrates a common map in accordance with various embodiments of the invention.

FIG. 2 illustrates a common map 202 for the processes of the first group, in accordance with various embodiments of the present invention. Common map 202 is a data structure that includes a list of various types of virtual addresses for the processes of the first group. Further, memory 108 includes a list of physical addresses of memory 108 that can be allocated to the processes of the first group. Multi-level page tables 204a and 204b are data structures that store the mappings between common map 202 and physical addresses of memory 108 for each of the processes. As illustrated in FIG. 2, common map 202 includes three types of virtual address ranges: common, private and unreserved. In common map 202, a first set of ranges of virtual addresses are designated as common addresses 206a, 206b and 206c. A second set of ranges of virtual addresses are designated as private addresses 208a and 208b. Additionally, a third set of ranges of virtual addresses is designated as unreserved address 210. Furthermore, an update module 212 is used to automatically modify common map 202 and multi-level page tables 204a and 204b on the addition or removal of virtual address ranges of the unreserved addresses to common addresses 206a, 206b and 206c and private addresses 208a and 208b and vice versa, based on the requirements of the application. For example, update module 212 can modify common map 202 and multi-level page tables 204a and 204b based on the addition of virtual address ranges of the unreserved addresses to common addresses 206a, 206b and 206c and/or private addresses 208a and 208b. Similarly, update module 212 can modify common map 202 and the multi-level page table based on the removal of virtual address ranges from common addresses 206a, 206b and 206c and/or private addresses 208a and 208b to the unreserved addresses.

The addition or removal of the virtual address ranges is performed dynamically at run-time, i,e. when the processes are in execution stage. The number of private, common and unreserved addresses can vary according to the requirements of memory 108 by the processes of the first group. Further, the update module 212 is configured to delay modification of the multi-level page table until one or more processes of the plurality of processes is referencing to a set of physical address ranges of memory corresponding to the common addresses. In this case, 'referencing' refers to association of one or more processes with a set of physical address ranges of memory corresponding to the common addresses and/or the private addresses.

Each of the common addresses can be used and shared by more than one process. For example, common address 206a can be used and shared by two processes 106a and 106b. Further, each of the private addresses can be used independently by each process for its own purposes. For example, process 106a may use private address 208a for some private purpose, while process 106b may use private address 208a for a different purpose, referencing different physical memory via its private page table. Private page table is a part of the multilevel page table that stores the mappings between private addresses 208a and 208b and corresponding physical addresses of memory 108 for each of the processes. Furthermore, the unreserved address can be used either as a common address or a private address, depending upon the requirements of memory 108 for the processes of the first group.

In accordance with an embodiment of the present invention, a common address for the first group cannot be shared by processes of the second group. For example, processes 106e and 106f cannot use and share the common addresses for the first group as the common addresses of the first and second groups are unrelated. Moreover, memory 108 is allocated to them independently of each other. The physical addresses of memory 108 corresponding to the common addresses are hereinafter referred to as common memory. Similarly, the physical addresses of memory 108 corresponding to the private addresses are hereinafter referred to as private memory.

Operating system 104 uses page tables 204a and 204b to manage the allocations and de-allocations of the various types of memory 108 to processes of the first group. A process can require private as well as common memory. Each of the page tables 204a and 204b is a process-specific table that maps the virtual address of the process to memory 108. For example, page table 204a stores the mappings of the virtual address of process 106a and memory 108, and page table 204b stores the mappings of the virtual address of process 106b and memory 108. When memory 108 is allocated to process 106a, page table 204a includes the address entries corresponding to the allocated memory 108. When memory 108 is de-allocated for process 106a, page table 204a of process 106a is updated, i.e., the address entries corresponding to the de-allocated memory 108 are removed from page table 204a. For the sake of explaining the invention, only two page tables have been illustrated in the figure. However, it would be apparent to a person of ordinary skill in the art that operating system 104 can use more than two page tables for managing the allocations and de-allocations of memory 108.

In accordance with an embodiment of the present invention, page tables 204a and 204b are multi-level page tables. Each of multi-level page tables 204a and 204b include top-level and lower-level page tables. In accordance with an embodiment of the present invention, common map 202 corresponds to some level of a multi-level page table. For example, in case of a two-level page table, common map 202 will correspond to the top-level page table. The multi-level page tables 204a and 204b are explained in detail with reference to FIG. 3.

Figure 3:
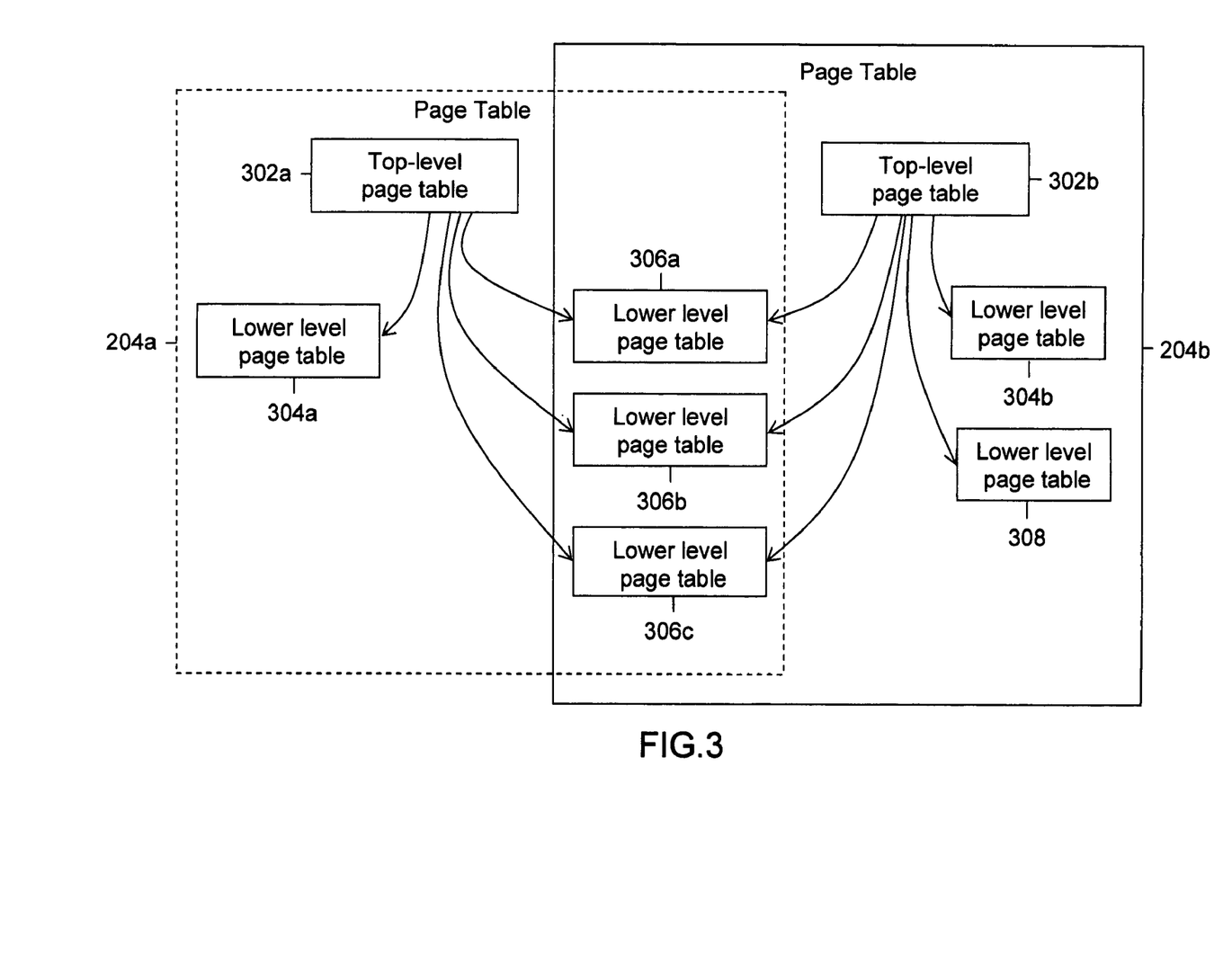
FIG. 3 illustrates page tables in detail in accordance with various embodiments of the present invention.

FIG. 3 illustrates multi-level page tables 204a and 204b in detail in accordance with various embodiments of the present invention. Page table 204a includes top-level page table 302a and lower level page tables 304a, 306a, 306b, and 306c. Further, page table 204b includes top-level page table 302b and lower level page tables 304b, 306a, 306b, 306c and 308. In accordance with an embodiment of the present invention, common map 202 corresponds to top-level page tables 302a and 302b. Lower level page tables 306a, 306b and 306c correspond to common addresses 206a, 206b and 206c and are shared among processes 106a and 106b. Top-level page tables 302a and 302b may contain pointers to shared lower level page tables 306a, 306b and 306c. Shared lower level page tables 306a, 306b and 306c are also referred to as common page tables.

Lower level page tables 304a, 304b, and 308 correspond to private addresses 208a and 208b of processes 106a and 106b. Lower level page tables 304a, 304b and 308 are used to provide independent private memory to processes 106a and 106b. Lower level page tables 304a, 304b and 308 are also referred to as private page tables. Common addresses 206a, 206b and 206c and private addresses 208a and 208b are represented as separate mapping for each of the plurality of processes. Further, common addresses 206a, 206b and 206c have identical mapping to the same shared memory in each of the plurality of processes for virtual addresses. As illustrated in FIG. 3, lower level page tables 304a, 304b and 308 are shown as unrelated to each other. This implies that each of the private page tables can be used by one process at a time. A private page table cannot be shared by two processes simultaneously, whereas, as illustrated in FIG. 3, the lower level page tables, 306a, 306b, and 306c, corresponding to common addresses are shared by processes 106a and 106b. The common page tables can be shared by two or more processes simultaneously. In accordance with an embodiment of the present invention, process 106a allocates memory 108 to private address 208a by using lower level page table 304a. Further, process 106b allocates memory 108 to private address 208b by using lower level page tables 308 and 304b.

When there is any change in allocation of memory 108 to common addresses 206a, 206b and 206c, lower level common page tables 306a, 306b and 306c are updated. Further, when there is any change in allocation of private memory to private addresses 208a and 208b, private page tables 304a, 304b, and 308 are updated. Furthermore, there is delaying in modification of the common page table until one or more processes of the plurality of processes is referencing the common memory.

Figure 4:
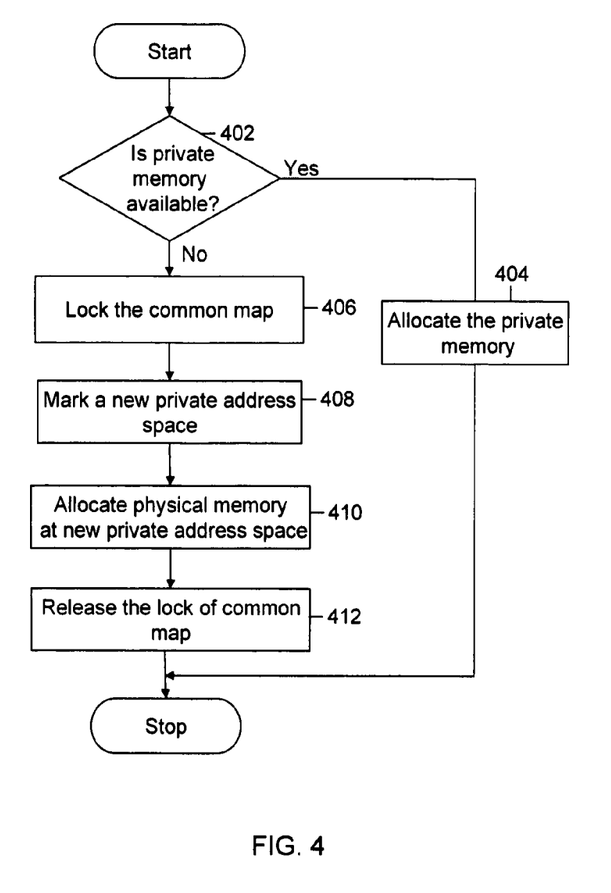
FIG. 4 is a flowchart that illustrates a method that allocates private memory to a process in accordance with various embodiments of the invention.

FIG. 4 is a flowchart to illustrate a method that allocates the private memory to a process such as process 106a, in accordance with various embodiments of the present invention. The private virtual address for process 106a is private address 208a and, therefore, requires private memory. At step 402, operating system 104 would look at lower level page table 304a to check whether the private memory is available at private address 208a. If the private memory is available at private address 208a, then the private memory is allocated to process 106a at step 404. Lower level page table 304a of process 106a is mapped onto the addresses of the private memory. The private memory is allocated to process 106a without locking common map 202. Usually, the common map 202 of a process is locked when memory is allocated to the process at an address, so that no other process can allocate the memory at the same address. However, in case of private address 208a, the private memory can be allocated to process 106a only and no other process can allocate the private memory of private address 208a. Therefore, common map 202 is not locked while allocating private memory to process 106a.

If private memory is not available at private address 208a, operating system 104 locks common map 202 at step 406. Further, at step 408, operating system 104 marks a new private address for process 106a. If an unreserved address such as unreserved address 210 is present in common map 202, then unreserved address 210 is marked as the new private address. If no unreserved address is present in common map 202, then the allocation fails and the application receives an error notification from the operating system. At step 410, memory 108 is allocated to process 106a at the new private address. Further, at step 412, the lock of common map 202 is released.

Figure 5:
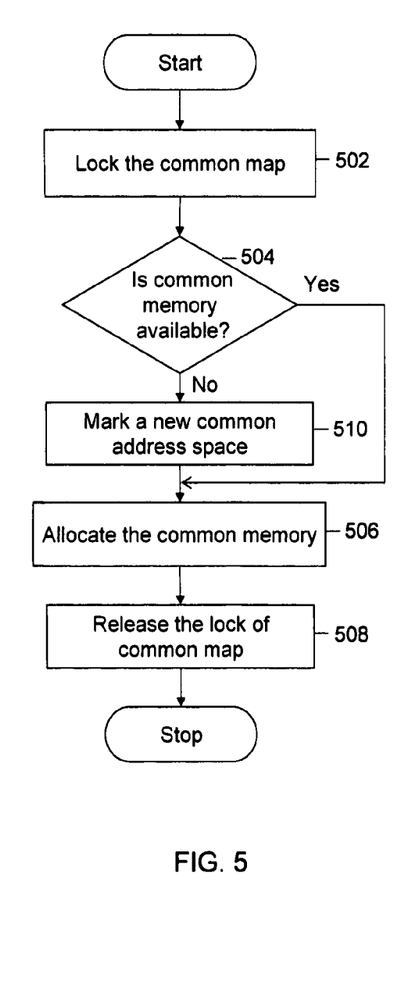
FIG. 5 is a flowchart that illustrates a method that allocates common memory to a process in accordance with various embodiments of the invention.

FIG. 5 is a flowchart to illustrate a method that allocates common memory to process 106a. Process 106a may require memory at common addresses 206a, 206b and 206c. At step 502, common map 202 is locked so that processes other than process 106a may not allocate common memory during the process of allocating common memory to process 106a. At step 504, it is determined whether the common memory is available at the common addresses. Process 106a sets a flag such as MAP_COMMON flag in the mmap system call and invokes the mmap system call, which causes operating system 104 to search for the common addresses at which the common memory is available. Operating system 104 checks the virtual address of process 106a and also the virtual address of other processes of the first group, and chooses common addresses that are free on all processes of the first group. For example, memory 108 can be available at common address 206a for allocation to process 106a. In accordance with an embodiment of the present invention, operating system 104 may reserve the available common address 206a to be used for future allocations of memory 108.

If common memory is available, at step 506, the common memory corresponding to common address 206a is allocated to process 106a. The allocations made for the common memory are referred to as MAP_COMMON allocations. When common memory is allocated to common address 206a, the shared lower level page table 306a that corresponds to common address 206a is updated. Further, at step 508, the lock of common map 202 is released. If common memory is not at any of the common addresses, then operating system 104 marks a new common address at step 510. An available unreserved address such as unreserved address 210 can be marked as a new common address. Further, steps 506, and 508 are repeated for allocating memory 108 at the new common address.

In accordance with an embodiment of the present invention, a page-fault handler of operating system 104 is modified to discover new common memory for process 106a when a new common address has been formed by another process. A page fault is an operating system 104 interrupt that occurs when process 106a tries to access a virtual address that does not correspond to a physical address in memory 108. A page fault occurs when the new common address may not be mapped onto a physical address in memory 108. When a page fault occurs, the page-fault handler locks common map 202 and checks whether a new common address has been added to common map 202. If a new common address has been added to common map 202, then the page-fault handler copies the pointer to the shared lower-level page tables 306a, 306b and 306c into page table 204a of process 106a and releases the lock. In this case, the pointer to the shared common page table may be a pointer to memory 108 of common address 206a if common address 206a is now used as a new common address. Similarly, the pointer to the shared common page table may be a pointer to unreserved address 210, if unreserved address 210 is now used as a new common address.

When common memory is allocated to process 106a, process 106a may pass a pointer to the common memory of other processes of the first group through a simple, unidirectional, one-time channel to make them aware of the allocated common memory. Examples of the one-time channel include, but are not limited to, a common writable configuration file.

In accordance with an embodiment of the present invention, when process 106a deallocates common memory, then the common page table corresponding to common address 206a is updated. The shared lower-level page tables are updated by unmapping the pages of common address 206a and the corresponding common memory. To implement the process of unmapping the pages of shared lower-level page tables, operating system 104 sends an interprocessor interrupt to the processors running processes 106a, 106b, 106c, and 106d. The interrupt is sent to clear the physical address entries corresponding to the unmapped common memory from the Translation Lookaside Buffer (TLB) of the processor. Also, the new common address, which was formed from unreserved address 210, can be reset to unreserved address 210, when the shared common page table corresponding to the new common address has no pages corresponding to memory 108.

In accordance with an embodiment of the present invention, process 106a can perform a 'fork'. The 'fork' is a UNIX Application Programming Interface (API) that creates a new process, which is almost identical to the creating process. When process 106a uses the 'fork', common map 202 is shared by the two new processes. Process 106a can make its own calls to 'fork' and start a new group of processes that share common addresses. The processes created from 'fork' belong to the same group of processes.

In accordance with another embodiment of the present invention, process 106a can perform an 'exec'. The 'exec' is a UNIX API that starts the execution of a specific executable program by overwriting the current process 106a with new code and data. When process 106a performs an 'exec', common map 202 is maintained. Operating system 104 will likely not flush any references to common mappings out of the top-level page table to maintain high efficiency. A high efficiency is achieved as the new program avoids taking the common lock and searching the common page table.

In accordance with another embodiment of the present invention, process 106a calls 'set_common'. 'Set_common' is a system call that tells operating system 104 to treat process 106a as the parent of a group of future processes that will participate in the allocation of the common memory. When process 106a calls 'set_common', operating system 104 drops the reference to common map 202, and unmaps all the common pages from the virtual address of process 106a.

In accordance with an embodiment of the present invention, the method of the present invention can be implemented in an Intel x86 architecture by using segment registers. One or more segments can be dedicated to the private memory. For example, the ds and fs segments on Linux/x86 can be dedicated to the private memory. Further, one or more segments can be dedicated to the common memory. A common segment can be allocated to a memory-mapped region of memory 108, and even if the data is mapped at different virtual addresses in different processes, the segment override can be used to make memory 108 effectively appear at the same address for all processes.

In accordance with another embodiment of the present invention, memory 108 can be shared in real-time among processes 106 with a user space solution. By defining an API for the dozen-odd kernel APIs, 'newAPI_xxx' variants can be created that broadcast the call out to all processes 106 and apply it. For example, the set of syscalls for which the variants can be created are: brk, mmap, munmap, shmat, mprotect, msync, mlock, munlock, mlockall, munlockall, mremap, madvise, remap_file_pages, and mbind. For mmap, a 'newAPI_mmap_common' API is created that would choose a MAP_FIXED address out of a reserved pool of virtual address 202. The newAPI secures up front and requires all the peer newAPI processes to reserve. When a 'newAPI_spawn' is created, part of it is used to recreate the common mappings in the new process, first by reserving virtual address 202 during newAPI_init's early startup, and then by just re-issuing the common mmap commands that the other peer processes have issued over their lifetime. The malloc library can be changed so that mmap, munmap, and mremap function pointers can be provided for a given mspace. Further, newAPI offers malloc shared API by creating an mspace that was built on ilib_mmap, ilib_munmap, and ilib_mremap. The advantage of implementing the data sharing scheme in user space is that it completely decouples the kernel. A kernel-based solution tracks future operating system kernel releases, merges in platform-independent code corresponding to all the APIs, and modify calling methods. The calling process first locks the map_common table and finds a virtual address 202 for the common memory. Then it broadcasts to the other tiles, interrupts them and causes them to copy the new common region into their private page tables via a call to the operating system's normal 'mmap' API, which maintains the private page table. When all of the tiles have updated their private page tables via 'mmap', the calling process releases the map_common table and returns.

In accordance with an embodiment of the present invention, the method of marking virtual addresses as private and common addresses improves the program security.

In accordance with an embodiment of the present invention, only common addresses are meant to be visible to the processes of the first group, thereby lowering the risk of data corruption.

In accordance with an embodiment of the present invention, the method and system of the present invention facilitate the allocation of common memory across the processes of the first group without acquiring multiple locks.

Further, the present invention allocates private and common memory to an application without the requirement to lock the common map on every allocation. This is ensured by partitioning the addresses at one level of the multi-level page table such that all addresses represented by that level's page table are either private or common.

The present invention allocates private memory and/or common memory to an application without requirement to lock the common map on every allocation, by partitioning the addresses at one level of the multi-level page table into private and common addresses. Since private addresses need not be locked during allocation, the common map is required to be locked for only those processes which require common memory.

In accordance with an embodiment of the present invention, the processes of the first group with distinct virtual addresses and using common memory can scale the amount of addressable memory in proportion to the number of processes. The amount of addressable memory is scaled in proportion to the number of processes as the common memory can be used by more than one process simultaneously.

The present invention provides efficient techniques for allocating new private memory or common memory to any of the processes, for choosing appropriate addresses for new private and common memory, and for efficiently discovering changes to the common address when another of the plurality of processes has made modifications.

The method and system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system typically comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/Output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a user through an input device, accessible to the system through an I/O interface.

The computer system executes a set of instructions that are stored in one or more storage elements in order to process input data. The storage elements may also hold data or other information as desired. The storage element may be in the form of an information source or a physical memory element present in the processing machine.

The programmable instructions may include various commands that instruct the processing machine to perform specific tasks such as the steps that constitute the method of the present invention. The method and systems described can also be implemented using only software programming or using only hardware or by a varying combination of the two techniques. The present invention is independent of the programming language used and the operating system in the computers. The instructions for the invention can be written in all programming languages including, but not limited to 'C', 'C++', 'Visual C++' and 'Visual Basic'. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine. The invention can also be implemented in all operating systems and platforms including, but not limited to, 'Unix', 'DOS', and 'Linux'.

What is claimed is:

1. A method for managing virtual addresses of a plurality of processes corresponding to an application, the method comprising:
   a. designating a first set of ranges of virtual addresses to the plurality of processes, wherein the virtual addresses of the first set of ranges map to a memory region shared among the plurality of processes;
   b. designating a second set of ranges of virtual addresses to the plurality of processes, wherein the virtual addresses of the second set of ranges map to a memory region independently used by a process of the plurality of processes;
   c. locking the first set of ranges of virtual addresses when allocating virtual addresses;
   d. locking the second set of ranges of virtual addresses when a private memory region is unavailable; and
   e. automatically performing one of:
      1. addition of virtual address ranges to one of the first set of ranges and the second set of ranges, wherein the addition is performed in virtual addresses of the plurality of processes; and
      2. removal of virtual address ranges from one of the first set of ranges and the second set of ranges, wherein the removal is performed in virtual addresses of the plurality of processes,
   based on one or more requirements of the application, without locking for every memory allocation.

2. The method according to claim 1 further comprising performing one of addition and removal of virtual address ranges dynamically at run-time, based on requirements of the application.

3. The method according to claim 1, further comprising using a single common map to designate virtual addresses for the plurality of processes to one of the first set of ranges and the second set of ranges, wherein the single common map is an operating system data structure.

4. The method according to claim 1 further comprising representing the first set of ranges and the second set of ranges as separate mapping for each of the plurality of processes.

5. The method according to claim 4, wherein representing the first set of ranges as a separate mapping comprises ensuring identical mapping between physical addresses of memory corresponding to the first set of ranges and virtual addresses of the first set of ranges for the plurality of processes.

6. A system for managing virtual addresses of a plurality of processes corresponding to an application, the system comprising a processor and a memory, the memory comprising:
   a. a common map, wherein the common map is an operating system data structure, the common map comprising:
      1. a first set of virtual address ranges wherein the virtual addresses of the first set of ranges map to a memory region shared by the plurality of processes, the first set of ranges of virtual addresses being locked when allocating virtual addresses;
      2. a second set of virtual address ranges wherein the virtual addresses of the second set of ranges map to a memory region independently used by a process of the plurality of processes, the second set of ranges of virtual addresses being locked when a private memory region is unavailable;
      3. a third set of virtual address ranges wherein the virtual addresses of the third set of ranges is configured to be used as one of a virtual address of the first set of ranges and a virtual address of the second set of ranges;
   b. a multi-level page table, for storing mapping between the virtual addresses and physical addresses of the memory, the multi-level page table comprising:
      1. a mapping between the first set of virtual address ranges and a set of physical address ranges of the memory corresponding to the first set of ranges stored at one or more levels of the multi-level page table; and
      2. a mapping between the second set of virtual address ranges and a set of physical address ranges of the memory corresponding to the second set of ranges stored at one or more levels of the multi-level page table.

7. The system according to claim 6 further comprising an update module configured to modify the common map and the multi-level page table based on one of:
   1. addition of virtual address ranges from the third set of virtual address ranges to one of the first set of ranges and the second set of ranges; and 2. removal of virtual address ranges from one of the first set of ranges and the second set of ranges to the third set of virtual address ranges, wherein the update module modifies the common map and the multi-level page table based on one of addition and removal of virtual address ranges without performing a locking operation for every memory allocation.

8. The system according to claim 7, wherein the update module is configured to delay modification of the multi-level page table corresponding to a mapping between the first set of virtual address ranges and the set of physical address ranges of memory corresponding to the first set of ranges until one or more processes of the plurality of processes is referencing to the set of physical address ranges of memory corresponding to the first set of ranges.

9. A computer program product for use with a computer, the computer program product comprising instructions stored in a computer usable medium having a computer readable program code embodied therein for managing virtual addresses of a plurality of processes corresponding to an application, the computer readable program code comprising:
   a. program instructions for designating a first set of ranges of virtual addresses to the plurality of processes, wherein the virtual addresses of the first set of ranges map to a memory region shared among the plurality of processes;
   b. program instructions for designating a second set of ranges of virtual addresses to the plurality of processes, wherein the virtual addresses of the second set of ranges map to a memory region independently used by a process of the plurality of processes;
   c. program instructions for locking the first set of ranges of virtual addresses when allocating virtual addresses;
   d. program instructions for locking the second set of ranges of virtual addresses when a private memory region is unavailable; and
   e. program instructions for performing one of:
      1. addition of virtual address ranges to one of the first set of ranges and the second set of ranges, wherein the addition is performed in virtual addresses of the plurality of processes; and
      2. removal of virtual address ranges from one of the first set of ranges and the second set of ranges, wherein the removal is performed in virtual addresses of the plurality of processes,    the performing being implemented based on one or more requirements of the application without locking for every memory allocation.

10. The computer program product according to claim 9 further comprising program instructions for using a single common map to designate virtual addresses for the plurality of processes to one of the first set of ranges and the second set of ranges, wherein the single common map is an operating system data structure.

\* \* \* \* \*